Dec. 8, 1959     J. VAN DER STER     2,915,883
GAS-FRACTIONATING COLUMN
Filed June 18, 1954
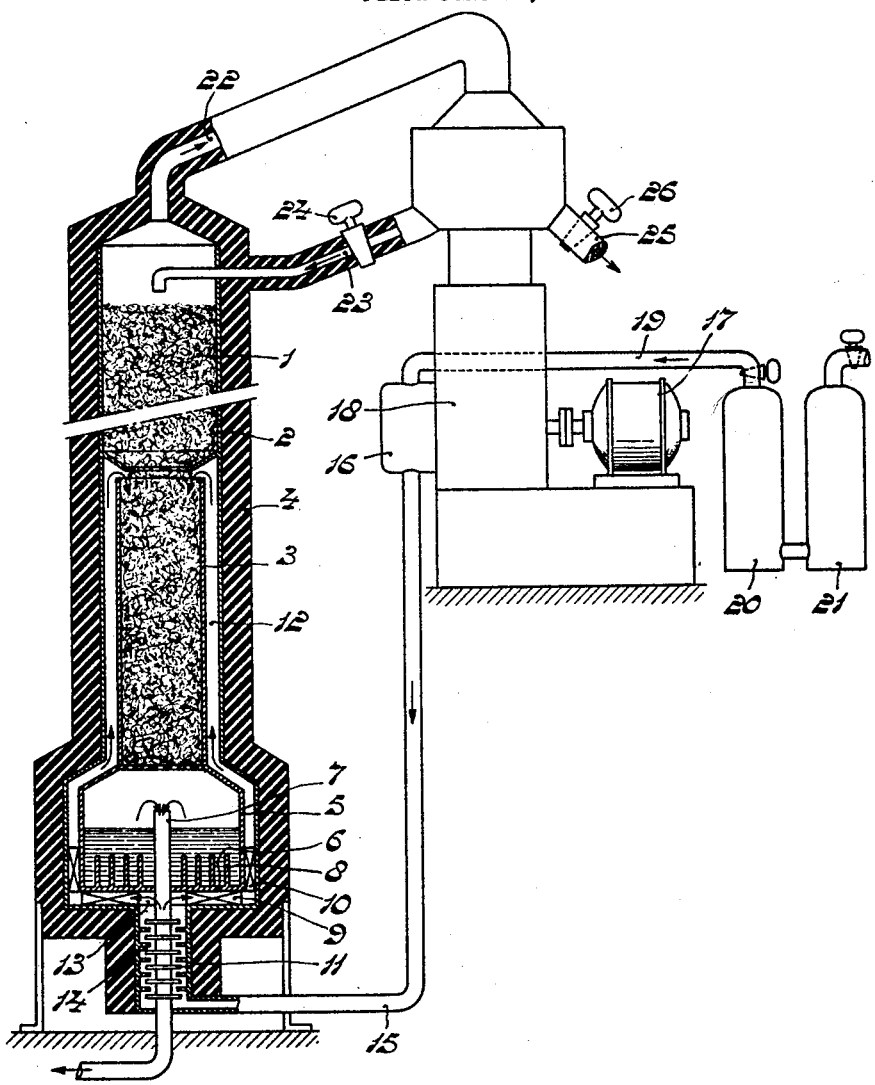
INVENTOR
JOHANNES VAN DER STER
BY
AGENT 2,915,883
Patented Dec. 8, 1959

2,915,883
GAS-FRACTIONATING COLUMN

Johannes van der Ster, Eindhoven, Netherlands, assignor, by mesne assignments, to North American Philips Company, Inc., New York, N.Y., a corporation of Delaware Application June 18, 1954, Serial No. 437,787

Claims priority, application Netherlands June 22, 1953

2 Claims. (Cl. 62—40)

This invention relates to a gas-fractionating column whereof the gas separating part is at least partly enclosed by a metal wall and comprises a heat exchanger with the use of which the liquid part of the fraction of the higher boiling point is in heat-exchanging contact with the gas mixture to be separated and subsequently supplied through a connecting duct to the column. The conventional fractionating columns generally comprise a connecting duct in the form of a pipe usually comprising a throttle valve.

With columns containing filling material (so-called "packed" columns) it is a well-known phenomenon that, unless special steps are taken, the liquid formed in the column tends to descend over the wall of the column instead of descending throughout the cross-sectional area of the column. This may cause insufficient contact of the descending liquid with the vapour rising in the column.

In technical literature it has been suggested to supply heat not only to the liquid in the boiler but also to the medium in the column.

According to the present invention a construction has been developed for a fractionating column with which, if the column is of the packed type, the flow of liquid along the wall is diminished or even entirely avoided. In this construction, moreover, heat is delivered to the medium over part of the height of the gas-separating column, which makes the construction suitable both for packed columns and for columns comprising trays.

In accordance with the invention the gas mixture in the connecting duct, which extends outside the wall of the column is in heat exchanging contact at least over part of said wall, with the medium contained in this part. If the column is of the packed type, the liquid flowing over said wall will at least partly evaporate due to the heat supplied to this wall, thus obtaining a more even distribution of the liquid throughout the cross-sectional area of the column.

The construction according to the invention may particularly be employed with success if the gas mixture to be separated is supplied at the same or substantially the same pressure both to the heat exchanger, wherein it is cooled by the liquid part of the fraction of the higher boiling point, and to the column. In this case it is desirable, in effect, that the medium, after having been cooled in said heat exchanger, is further cooled which may be done in the connecting duct.

The connecting duct may, for example, consist of one or more pipes soldered to the wall of the column.

A structurally very simple embodiment in accordance with the invention comprises a second wall surrounding the column wall, the space between these walls forming a connecting duct. The second wall is preferably arranged concentrically with the first wall with the result of obtaining an even distribution of the gas mixture throughout the cross-sectional area of the wall.

This construction affords special advantage for use with so-called half columns and single columns. With the former the gas mixture to be separated is supplied at the top of the column, while in the case of single columns it is supplied at the point intermediate the ends of the column.

In order that the invention may be readily carried into effect, it will now be described in greater detail with reference to the accompanying drawing, given by way of example, which is a longitudinal section of a gas-fractionating column.

The column has a gas-separating part 1 surrounded at the upper end by a wall 2 and at the lower end by a metal wall 3 of smaller diameter. The column is further surrounded by a jacket 4 having heat insulating properties. At the lower end of the column a boiler 5 is provided wherein the fraction of the higher boiling point is brought to the boil. The boiler is provided with a tube 7 which passes through the bottom 6 of the boiler. The bottom 6 is internally provided with fins 8 and externally with fins 9, the sidewall of the boiler also comprising fins 10. The tube 7 protrudes from the normal liquid level in the boiler and its part outside the boiler is furnished with fins 11. Between the wall 3 and the wall 2 a space 12 is formed which extends along the wall of the boiler. This space is connected with a space 13 below the boiler and with a space 14 surrounding the tube 7. Connected with the space 14 is a duct 15 which is connected to a pump 16. The pump is driven by an electric motor 17 which also drives the gas refrigerator 18.

A duct 19 comprising cleaning vessels 20 and 21 is connected to the pump 16.

The column is provided at the top with a duct 22 connected with the gas refrigerator 18. The fraction of the lower boiling point, which escapes from the column, is condensed in the gas refrigerator. Part of the condensed product is delivered as reflux to the column through a duct 23 with a throttle valve 24, while another part is carried off through a duct 25 comprising a cock 26.

In the operation of the system the gas mixture to be separated, for example air, is supplied with the use of pump 16 through the duct 19, after having removed any impurities of the air, for example water vapour and carbonic acid, in the vessels 20 and 21. The air, which need only have a low excess pressure on leaving the pump 16, subsequently passes through the duct 15 and over the fins of the tube 7 with the result of cooling the air. Further cooling is effected by its flow over the fins 10 and 9 of the boiler 5.

Subsequently the air flows through the connecting duct 12 and is fractionated in the column. The liquid fraction of the higher boiling point, for example oxygen, is collected in the boiler 5. Due to the heat withdrawn from the air to be separated, said oxygen evaporates again, part of the vapour rising in the column and another part leaving the column through the duct 7. At the top of the column, the fraction of the lower boiling point, for example nitrogen, is in the vapour state. Said nitrogen is delivered through the duct 22 to the gas refrigerator 18 in which it condenses. Part of the condensed product is again supplied as reflux through the duct 23 to the column and another part is carried off through the duct 25.

The column is a so-called packed column. It may contain suitable filling material, for example Raschig rings. Such packed columns suffer from a limitation in that the descending liquid sometimes flows mainly over the walls of the column, while vapour rises at the center of the column with a resulting insufficient contact between vapour and liquid. In the construction in accordance with the invention, said limitation is considerably reduced or even obviated, at least as regards the lower part of the column, since the metal wall 3 of the column is heated by the rising air. Due to said heating the liquid passing over the wall of the column is brought to a boil due to the effect of distributing the flow of liquid over the wall. In this construction, moveover, heat it supplied over part of the height of the column, which may be desirable in some cases.

In this embodiment the gas mixture to be separated is delivered to the column at a pressure corresponding or substantially corresponding to the pressure at which said gas mixture is supplied to the heat exchanger in the form of fins 10, in contradistinction to a great many of known systems comprising a throttle valve in the duct connecting the heat exchanger and the column.

It will, however, be evident that cold may alternatively be withdrawn from the column with the use of other refrigerators, for example compression refrigerators.

The represented system comprises vessels 20 and 21 in which the gas mixture to be separated is cleansed. This method has the disadvantage that the vessels occupy comparatively much space and require to be replaced from time to time.

What is claimed is:

1. A gas fractionating apparatus for separating gaseous mixtures into at least two fractions comprising a fractionating column having a boiling vessel at the bottom thereof for the liquid portion of the fraction of the higher boiling point, a duct for the supply of gaseous mixture to said column, a tube in the boiling vessel for the conduct of vapor of high boiling fraction to the atmosphere, said tube having a part thereof extending through said column and provided with means in heat exchanging relationship with said gaseous mixture being introduced into said column, an insulated jacket surrounding said column but being spaced only from the lower part of said column to thereby form a passage outside of the column for transporting the gaseous mixture to be separated to said column at a point substantially intermediate of the ends thereof, said passage being interconnected with said duct, a heat exchanger by which the liquid portion of the fraction of the higher boiling point is in heat exchanging contact with the gaseous mixture to be separated, the latter being subsequently conducted through said passage to said column and being in heat exchanging contact with the media on the inside of said column, and an outlet opening into said column at said intermediate point, the upper part of said column engaging said insulated jacket and being provided with a deflecting plate, said upper part being separated from said lower part of said column by said deflecting plate and said outlet opening into said column.

2. A gas fractionating apparatus as claimed in claim 1 wherein said column is a packed column.

References Cited in the file of this patent

UNITED STATES PATENTS

| | | |
|---|---|---|
| 795,525 | Linde | July 25, 1905 |
| 1,518,255 | Dodds | Dec. 9, 1924 |
| 1,890,646 | Frankl | Dec. 13, 1932 |
| 1,968,093 | Otto et al. | July 31, 1934 |
| 2,281,906 | Adams | May 5, 1942 |

FOREIGN PATENTS

| | | |
|---|---|---|
| 579,712 | Great Britain | Aug. 13, 1946 |